United States Patent
French et al.

(10) Patent No.: US 6,898,701 B2
(45) Date of Patent: May 24, 2005

(54) METHOD AND SYSTEM FOR ORGANIZED BOOTING OF A TARGET DEVICE IN A NETWORK ENVIRONMENT BY A RESERVATION SERVER BASED ON AVAILABLE BOOT RESOURCES

(75) Inventors: Steven M. French, Austin, TX (US); Chakkalamattam J. Paul, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 09/844,339

(22) Filed: Apr. 27, 2001

(65) Prior Publication Data

US 2002/0161995 A1 Oct. 31, 2002

(51) Int. Cl.[7] ............................................. G06F 9/445
(52) U.S. Cl. ........................ 713/2; 713/100; 709/217; 709/220
(58) Field of Search ................ 713/2, 1, 100; 709/217, 220

(56) References Cited

U.S. PATENT DOCUMENTS

| | | | | |
|---|---|---|---|---|
| 5,446,847 A | * | 8/1995 | Keeley et al. | 710/100 |
| 6,052,779 A | * | 4/2000 | Jackson et al. | 713/2 |
| 6,631,115 B1 | * | 10/2003 | Sendelbach et al. | 370/229 |

* cited by examiner

Primary Examiner—Rehana Perveen
Assistant Examiner—Eric Chang
(74) Attorney, Agent, or Firm—Cardinal Law Group; Jeffery S. LaBaw

(57) ABSTRACT

A method of booting a plurality of target devices in communication with a network so that the target devices do not time out is provided. A request for a boot file is received at a loading device, from at least one target device. A boot reservation server in communication with the plurality of target devices is contacted. At the boot reservation server, boot resources of the network are evaluated to determine a response to the at least one target device. A boot delay is executed at the at least one target device as the response. Systems and programs for using the method are also provided.

37 Claims, 4 Drawing Sheets

METHOD AND SYSTEM FOR ORGANIZED BOOTING OF A TARGET DEVICE IN A NETWORK ENVIRONMENT BY A RESERVATION SERVER BASED ON AVAILABLE BOOT RESOURCES

BACKGROUND OF THE INVENTION

1. Field of the Invention

The present invention relates to client computers that are bootable over a network and, in particular, client computers that may attempt to boot in competition with other client computers. More specifically, the present invention relates to a method for evaluating one or more target devices and their network environment and booting one or more target devices accordingly.

2. Description of the Related Art

Some current computing devices include support for pre-boot extensions to download an operating system (OS) from a network to which they are attached. Such target computing devices include computer motherboards, network adapters and boot diskettes.

These devices may rely on extensions to the bootstrap protocol (BOOTP) and to the dynamic host configuration protocol (DHCP). Such extensions are often termed the preboot execution environment (PXE) and require a DHCP/PXE server and a boot image negotiation layer (BINL) server. Alternatively, these devices may use a feature such as the Remote Program Load (RPL) feature to gain access to the network and request an operating system and other applications. The RPL feature enables the target device to request a bootstrap from another device with a disk drive (the loading device) within the network. The RPL feature also allows the loading device to send the bootstrap to the target device. This loading device may be, for example, a server or another suitable loading device.

With the use of a PXE system or the RPL feature, occasionally a number of target machines may attempt to boot from the network (e.g., from a server or from a loading device) at the same time. In some instances, one or more target machines do not receive the requested bootstrap before ROM on the target machines causes a time out. Such target machines then require a manual reset to cause the boot sequence to re-start on the target machine.

BOOTP is a transmission control protocol/Internet protocol (TCP/IP) used by a diskless workstation, network computer (NC) or other target device to obtain its IP address and other network information, such as server address and default gateway. Upon startup, the target device sends out a BOOTP request to the BOOTP server, which returns the required information. The BOOTP request and response use an IP broadcast function, which is able to send messages before a specific IP address for a target device is known.

DHCP is software that automatically assigns an IP address to a target device logging onto a TCP/IP network. DHCP eliminates the need for manually assigning permanent IP addresses.

PXE enables a client network computer or other target device that lacks a native operating system to locate and acquire a small network bootstrap program (NBP) from a BINL server. The target device may acquire this NBP from a BINL server through a network attachment. PXE also provides a means for running the NPB on the target device. This allows the target device to continue acquiring additional software from the network that may be required to make the target device capable of performing the more complex and useful tasks assigned to it by an enterprise.

PXE relies on extensions of DHCP as the means by which the target device locates a BINL server from which to acquire an NPB. A facilitating property of DHCP is that the target device does not need the address of any other computer. The target device performs a DHCP broadcast to discover any PXE proxy server that can recognize that the target device is PXE-capable. The DHCP proxy server sends a DHCP offer to the target device. The offer contains the address of the BINL server from which the target device may obtain a NBP. The target device then obtains the NBP and all necessary software from the boot server via a trivial file transfer protocol (TFTP).

RPL enables a client network computer or other target device that lacks a native operating system to locate and acquire a bootstrap program (NBP) from a loading device. The target device may acquire this NBP from the loading device through a network attachment. RPL also provides a means for running the NPB on the target device. This allows the target device to continue acquiring additional software from the loading device that may be required to make the target device capable of performing the more complex and useful tasks assigned to it by an enterprise.

RPL generally relies on two programs. These programs are a bootstrap program and a loader program. The bootstrap program is sent by the loading device to one or more target devices. After being installed in the target device, the bootstrap program initializes and restarts the target device. The bootstrap program may be a complete operating system, a program that requests files, a program that requests other programs or any suitable combination of the above.

The loader program sends the bootstrap program to the target device in response to a load request from the target device. The target device may have a RPLBOOT.COM program, which marks the fixed disk in the target device as non-bootable so that the RPL feature can take control when the target device is started.

Whether the target machine relies on PXE and a PXE server or RPL and an RPL loading device to receive its bootstrap, occasionally, the network traffic may be so heavy that the target machine's boot request is ignored and the target machine times out. This may occur, for example, due to heavy network or server load in a boot-storm environment, such as after a power failure and restore, when a number of target devices attempt to boot at the same time.

Alternatively, a target machine's boot request may be acknowledged but due to time outs of network file in and file out requests that occur as the boot sequence is being implemented, the target machine still times out.

In such situations, the resources of the network may be severely overloaded and target machines suffer because there are not enough resources available to boot a given machine.

Target machines that time out in this manner require a manual reset. This may be problematic in a server-managed environment because the timed-out target device may no longer be controlled from the server or any other device on the network. Rather, an actual person must manually reset the target device. Thus, current approaches to booting a target device in the presence of network delays may require a manual reset.

It would be desirable therefore to provide a method of booting a target device in a network environment that overcomes the above.

SUMMARY OF THE INVENTION

One aspect of the present invention provides a method of booting a plurality of target devices in communication with a network so that the target devices do not time out. A request for a boot file is received at a loading device, from at least one target device. A boot reservation server in communication with the plurality of target devices is contacted. At the boot reservation server, boot resources of the network are evaluated to determine a response to the at least one target device. A boot delay is executed at the at least one target device as the response.

A bootstrap may be executed at the target device, the bootstrap adapted to request permission from the boot reservation server to boot. A permission value of the target device may be evaluated and the boot delay executed based on the permission value. A delay value may be transmitted to the target device wherein the delay value delays the target device from requesting files. A permission value may also be transmitted to the target device wherein the permission value allows the target device to request files. A boot block of the target device may be configured with a timeout value as the response and the target device may be rebooted after the timeout value has expired. A user command may be received and the boot delay executed based on the user command.

A boot duration may be determined for each target device and the boot delay executed based on the device boot duration. A target operating system may be determined for each device and a maximum number of target devices to receive the target operating system may be determined. The boot file may be transmitted to the target device if the maximum number has not been attained. A boot duration of a target operating system for each target device may be determined and the boot delay executed based on the boot duration of the target operating system.

Another aspect of the present invention provides computer program product in a computer usable medium for booting a plurality of target devices in communication with a network so that the target devices do not time out. The program may comprise means for receiving, at a loading device, a request for a boot file from at least one target device, means for contacting a boot reservation server in communication with the plurality of target devices, means for evaluating, at the boot reservation server, boot resources of the network to determine a response to the at least one target device, and means for executing a boot delay at the at least one target device as the response.

The program may also include means for executing a bootstrap at the target device, the bootstrap adapted to request permission from the boot reservation server to boot. The program may also include means for evaluating a permission value of the target device; and means for executing the boot delay based on the permission value. The program may also include means for transmitting a delay value to the target device wherein the delay value delays the target device from requesting files. The program may also include means for transmitting a permission value to the target device wherein the permission value allows the target device to request files. The program may also include means for configuring a boot block of the target device with a timeout value as the response; and means for rebooting the target device after the timeout value has expired. The program may also include means for receiving a user command; and means for executing the boot delay based on the user command.

The program may also include means for determining a device boot duration for each target device; and means for executing the boot delay based on the device boot duration. The program may also include means for determining a target operating system for each target device, means for determining a maximum number of target devices to receive the target operating system and means for transmitting the boot file to the target device if the maximum number has not been attained. The program may also include means for determining a boot duration of a target operating system for each target device; and means for executing the boot delay based on the boot duration of the target operating system.

Another aspect of the present invention provides a system for booting a plurality of target devices in communication with a network so that the target devices do not time out. The system may include means for receiving, at a loading device, a request for a boot file from at least one target device, means for contacting a boot reservation server in communication with the plurality of target devices, means for evaluating, at the boot reservation server, boot resources of the network to determine a response to the at least one target device; and means for executing a boot delay at the at least one target device as the response. The system may also include means for executing a bootstrap at the target device, the bootstrap adapted to request permission from the boot reservation server to boot. The system may also include means for evaluating a permission value of the target device; and means for executing the boot delay based on the permission value.

The system may also include means for transmitting a delay value to the target device wherein the delay value delays the target device from requesting files. The system may also include means for transmitting a permission value to the target device wherein the permission value allows the target device to request files. The system may also include means for configuring a boot block of the target device with a timeout value as the response; and means for rebooting the target device after the timeout value has expired. The system may also include means for receiving a user command; and means for executing the boot delay based on the user command.

The system may also include means for determining a device boot duration for each target device; and means for executing the boot delay based on the device boot duration. The system may also include means for determining a target operating system for each target device, means for determining a maximum number of target devices to receive the target operating system and means for transmitting the boot file to the target device if the maximum number has not been attained. The system may also include means for determining a boot duration of a target operating system for each target device; and means for executing the boot delay based on the boot duration of the target operating system.

Another aspect of the present invention provides a system for booting a target device in communication with a network. The system includes a plurality of target devices, at least one loading device in communication with the target device, and at least one boot reservation server in communication with the loading device for evaluating boot resources of the network and sending a response to prevent the target device from timing out, the response based on the boot resources.

Another aspect of the present invention provides a resource reservation server for booting a plurality of target devices in communication with a network so that the target devices do not time out. The server comprises means for determining a target operating system for each target device, means for determining a maximum number of target devices to receive the target operating system means for determining a boot duration for each target operating system; and means for determining a response to each target device based on the target operating system, the maximum number and the boot duration.

The foregoing, and other, features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims in equivalence thereof.

DETAILED DESCRIPTION OF THE PRESENTLY PREFERRED EMBODIMENTS

Figure 1:
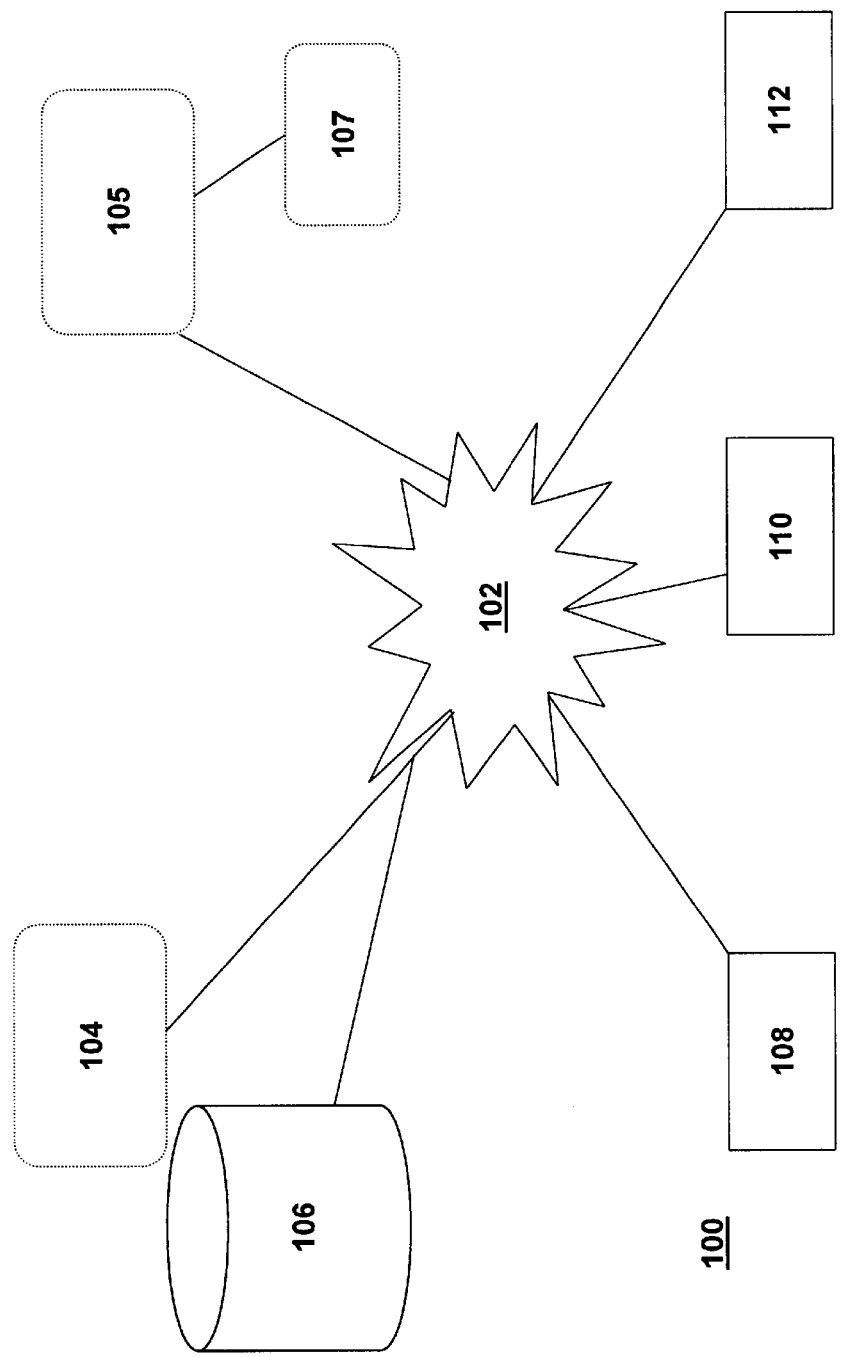
FIG. 1 is a schematic diagram of one embodiment of a network of data processing systems in accordance with the present invention.

FIG. 1 is a schematic representation of a network of data processing systems in accordance with the present invention at 100. Network data processing system 100 may be a network of computers in which the present invention may be implemented. Network data processing system 100 may contain a network. Network 102 may be any suitable medium used to provide communications links between various devices, such as computers, connected to or in communication with each other within network data processing system 100. For example, network 102 may include connections, such as wire connections, wireless communication links or fiber optic cables.

In the embodiment of FIG. 1, a server 104 may be in communication with network 102. Server 104 may provide data, such as boot files, operating system images and applications to network 102 and/or to other components in communication with network 102 as described below. System 100 may also include another server 105 which may be identical to or different from server 104. Server 105 may also provide data, such as boot files, operating system images and applications to network 102 and/or to other components in communication with network 102 as described below. System 100 may also include additional servers (not shown).

One or more storage units, such as storage unit 106 may also be in communication with server 104, 105 and/or network 102. Storage unit 106 may store data, such as boot files, operating system images and applications that may be processed or conveyed by server 104. Storage unit 106 may also store data to be made available to or processed by network 102 and/or to other components in communication with network 102 as described below.

In addition, target devices 108, 110 and 112 are also in communication with network 102. These target devices may be, for example, personal computers or network computers. Target devices 108, 110, 112 may serve as clients to server 104. Network data processing system 100 may include additional servers, clients and other devices not shown.

As seen in FIG. 1, network data processing system 100 may be any suitable system of processing data. For example system 100 may be the Internet. Alternatively, network data processing system 100 may also be any suitable type of network such as, for example, an intranet, a local area network (LAN) or a wide area network (WAN). In one embodiment of the invention, network 102 represents a worldwide collection of networks and gateways that use the TCP/IP suite of protocols to communicate with one another. A backbone of high-speed data communication lines between major nodes or host computers allows communication between thousands of commercial, government, educational and other computer systems that route data and messages.

One embodiment of the present invention provides a network environment, which may include a boot reservation server. For example, boot reservation server may be server 104, 105 or may be located on server 104, 105. Alternatively, as seen in FIG. 1, boot reservation server may be a separate server as indicated at 107.

Boot reservation server 107 may be any server capable of evaluating network boot resources and/or parameters. For example, boot reservation server 107 may be able to examine configuration files of target devices attached to the network and determine the OS of each target device. Boot reservation server 107 may also be able to examine one or more inventory databases of hardware scan information. Boot reservation server may also be able to examine other components of the network, such as loading devices or servers and evaluate the number of target devices requiring a specific OS that may be remotely booted from one or more loading devices or server. Boot reservation server 107 may also be able to determine the total duration required for a boot to complete on one or more target devices. Thus, boot reservation server may be able to evaluate the time it would take to boot a particular target device with a particular OS within a given network environment and to compare this with other target devices to determine which target device to boot first. Boot reservation server 107 may also use other suitable capacity description files, for example, parameters or descriptions provided by the system administrator, to make such determinations. Boot reservation server 107 may be capable of dynamically determining or learning network boot resources and/or parameters. Boot reservation server 107 may be capable of evaluating these parameters on a target device, a loading device or any other component of the network.

Boot reservation server 107 may monitor one or more suitable parameters for determining network boot resources, including, but not limited to, network congestion, server CPU utilization, server disk utilization, and numbers and resources of target devices in the process of booting. Boot reservation server 107 may also be capable to comparing these parameters to predetermined thresholds or to configurable thresholds.

The present invention may also provide a network environment, which may include a DHCP/PXE proxy server. For example, server 104 may be a DHCP/PXE proxy server. Alternatively, server 105 may be a DHCP/PXE proxy server. System 100 may also include one or more boot servers. For example server 104 or server 105 may serve as a boot server. These boot servers may be co-located on servers 104, 105 with the DHCP/PXE proxy servers. In one embodiment of the invention, one or more target devices, such as devices 108, 110, 112, may include pre-boot extensions that allow the devices to download OS information from a boot server.

The present invention may also provide a network environment which may include one or more loading devices equipped with a remote loading feature and/or programs, such as, for example, a RPL function. For example, servers 104, 105 may serve as a loading device. Alternatively, one or more of target devices 108, 110, 112 may be equipped with a remote loading feature and/or programs and may serve as loading devices to other target devices. For example, a target device 108, 110, 112 equipped with a bootstrap program and a loader program may send the bootstrap program to one or more other target devices that broadcast a load request.

In one embodiment of the invention, one or more target devices, such as devices 108, 110, 112 may include features and/or programs that enable the devices to download OS information from a loading device. For example, the target device may include an RPLBOOT.COM program, which marks the fixed disk in the target device as non-bootable so that the RPL feature can take control when the target device is started. The target device may also include a program, which enables it to broadcast a load request.

Figure 2:
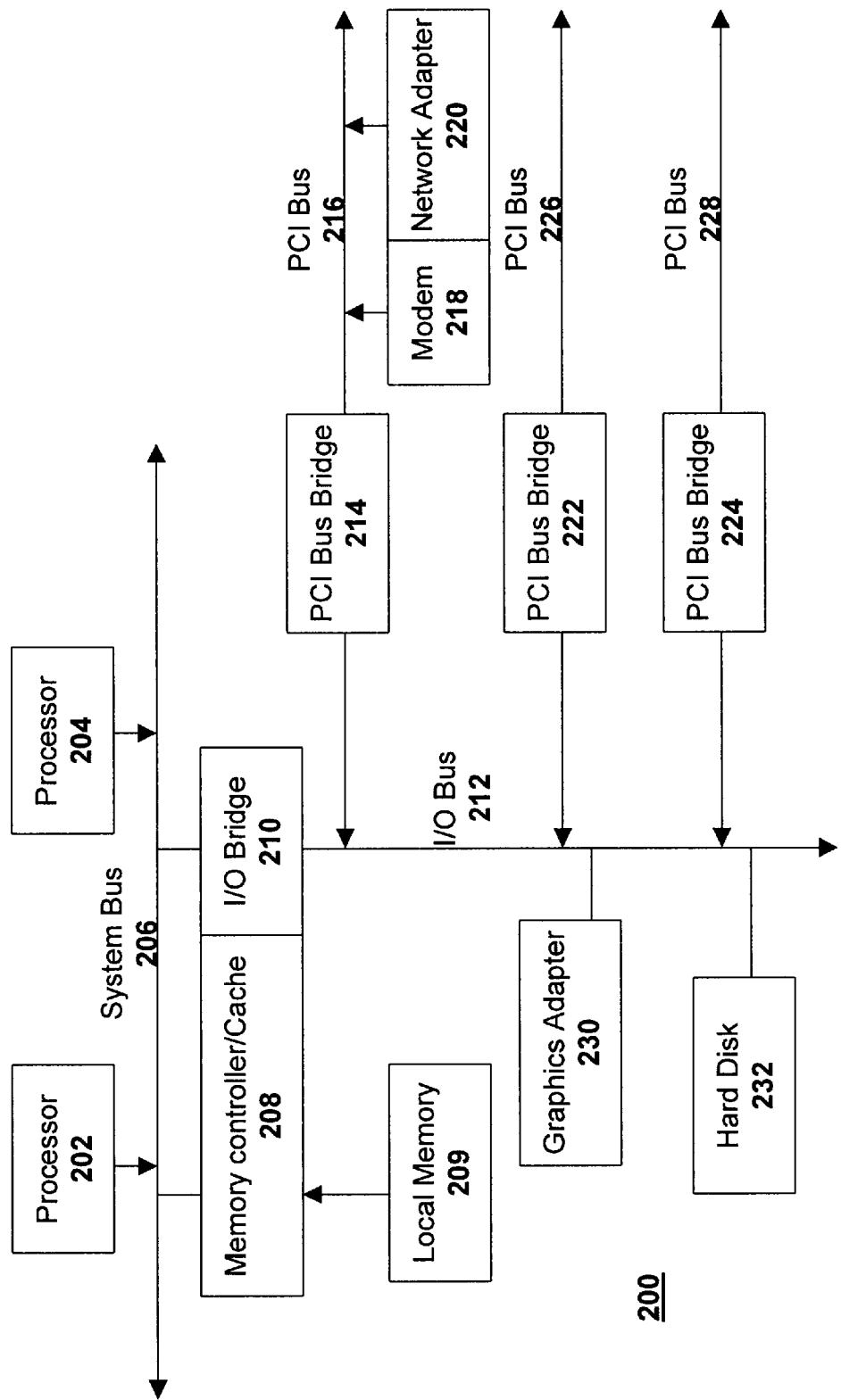
FIG. 2 is a block diagram of one embodiment of a data processing system in accordance with the present invention.

FIG. 2 is a block diagram of a data processing system in accordance with the present invention at 200. In one embodiment of the invention, data processing system 200 may be implemented as one or more of the servers 104, 105 shown in FIG. 1.

Data processing system 200 may be a symmetric multi-processors (SMP) system including a plurality of processors 202 and 204 connected to system bus 206. Alternatively, a single processor system may be employed. Memory controller/cache 208 may also be connected to system bus 206. Memory controller/cache 208 may provide an interface to local memory 209. I/O bus bridge 210 may also be connected to system bus 206 and may provide an interface to I/O bus 212. Memory controller/cache 208 and I/O bus bridge 210 may be integrated as depicted or may be separate components.

Peripheral component interconnect (PCI) bus bridge 214 connected to I/O bus 212 may provide an interface to PCI local bus 216. One or more modems may be connected to PCI bus 216. Typical PCI bus implementations will support four PCI expansion slots or add-in connectors. Modem 218 and network 220 may be connected to PCI local bus 216. This connection may be through add-in boards. In one embodiment of the invention, modem 218 and accompanying connections provide communications links to target devices such as network computers. For example, such target devices may be those described above at FIG. 1.

Additional PCI bus bridges 222 and 224 may provide interfaces for additional PCI buses 226 and 228. Additional modems or network adapters may be supported from PCI buses 226 and 228. For example, in one embodiment of the invention, PCI buses 226, 228 may support a network adapter with a remote loading feature, such as the RPL feature, installed. In this manner, data processing system 200 may allow connections to multiple network computers. A memory-mapped graphics adapter 230 and hard disk 232 may also be connected to I/O bus 212 as depicted, either directly or indirectly.

The components depicted in FIG. 2 may be arranged as shown or in any suitable manner that allows data processing system 200 to function as desired. Additionally, other peripheral devices, such as optical disk drives and the like, may be used in addition to or in place of the components depicted.

Figure 3:
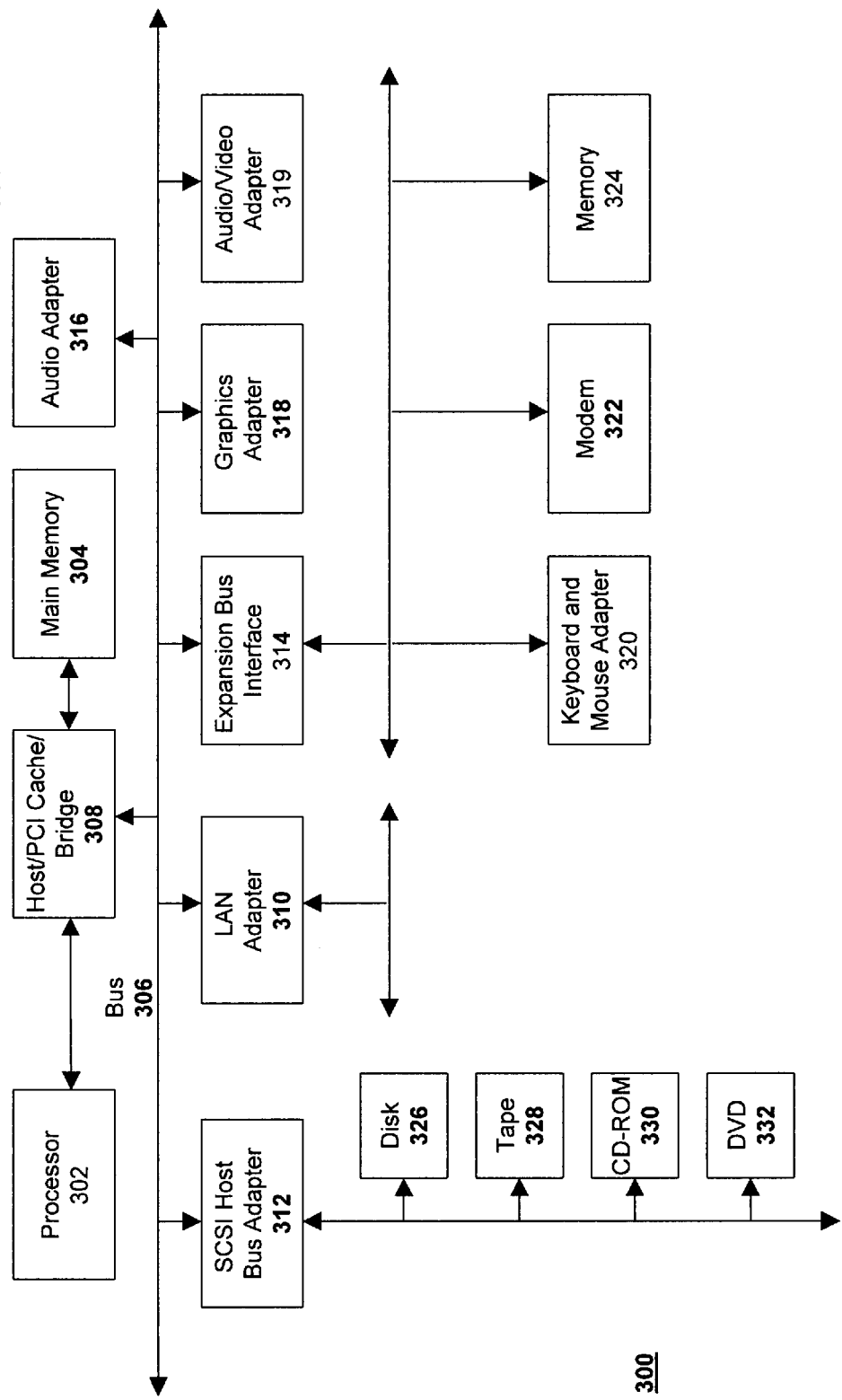
FIG. 3 is a block diagram of another embodiment of a data processing system in accordance with the present invention.

FIG. 3 is a block diagram of a data processing system in accordance with the present invention at 300. Data processing system 300 may be, for example, one or more of the target devices 108, 110, 112 depicted in FIG. 1 and described above. In one embodiment of the invention, data processing system 300 is a target device on which the disk drives are optional. Alternatively, data processing system 300 may be a stand-alone system configured to be bootable without relying on a network communication interface. Alternatively, data processing system 300 may also comprise one or more network communication interfaces. Data processing system 300 may also be a personal digital assistant (PDA) device. Data processing system may also take the form of a notebook computer or handheld computer. Alternatively, data processing system 300 may be a kiosk or Web appliance. The processes of the present invention may also be applied to a multiprocessor data processing system.

Data processing system 300 may employ a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 may be connected to PCI local bus 306 via PCI bridge 308. PCI bridge 308 may also include an integrated memory controller and cache memory for processor 302. Additional connections to PCI local bus 306 may be made through direct component interconnection or through add-in boards. In one embodiment of the invention, local area network (LAN) adapter 310, SCSI host bus adapter 312, and expansion bus interface 314 are connected to PCI local bus 306 by direct component connection. In contrast, audio adapter 316, graphics adapter 318 and audio/video adapter 319 are connected to PCI local bus 306 by add-in boards inserted into expansion slots. Expansion bus interface 314 may provide a connection for additional components such as, for example, a keyboard and mouse adapter 320, a modem 322 and additional memory 324. A small computer system interface (SCSI) host bus adapter 312 may provide a connection for additional components such as, for example, a hard disk drive 326, a tape drive 328, a CD-ROM drive 330 or a DVD 332. PCI local bus 306 may be any suitable local bus implementation. Typical PCI local bus implementations support three or four PCI expansion slots or add-in connectors.

In one embodiment of the invention, an operating system (OS) may run on processor 302. This OS may be used to coordinate and provide control of various components within data processing system 300. The OS may be a commercially available operating system, such as, for example, Linux™, OS/2 Warp 4, or Windows 2000™. An object oriented programming system may be in communication with the OS and may run in conjunction with the OS. For example, the object-oriented programming system may provide calls to the OS from programs or applications executing on data processing system 300. These programs or applications may be specific to the object-oriented programming system or may be programs or applications run by other programming systems. In one embodiment of the invention, the object-oriented programming system may be Java™, a trademark of Sun Microsystems, Inc.

Instructions for the OS, the object-oriented operating system, and applications or programs may be located on storage devices such as, for example, hard disk drive 326. These operating systems, applications and/or programs may be loaded into main memory 304 for execution by processor 302.

In one embodiment of the invention, system 300 may include a suitable configuration file which may indicate boot parameters that may be evaluated to determine network boot resources as described above.

The components of system 300 depicted in FIG. 3 may be arranged as shown or in any suitable manner that allows data processing system 300 to function as desired. Other internal hardware or peripheral devices, such as flash ROM (or equivalent nonvolatile memory) or optical disk drives and the like, may be used in addition to or in place of the components depicted. For example, one embodiment of data processing system 300 may be configured with ROM and/or flash ROM in order to provide non-volatile memory for storing operating system files and/or user-generated data. Another embodiment of data processing system 300 may include network adapters suited to transmit or receive functions of a remote loading program and/or feature such as the RPL feature.

Figure 4:
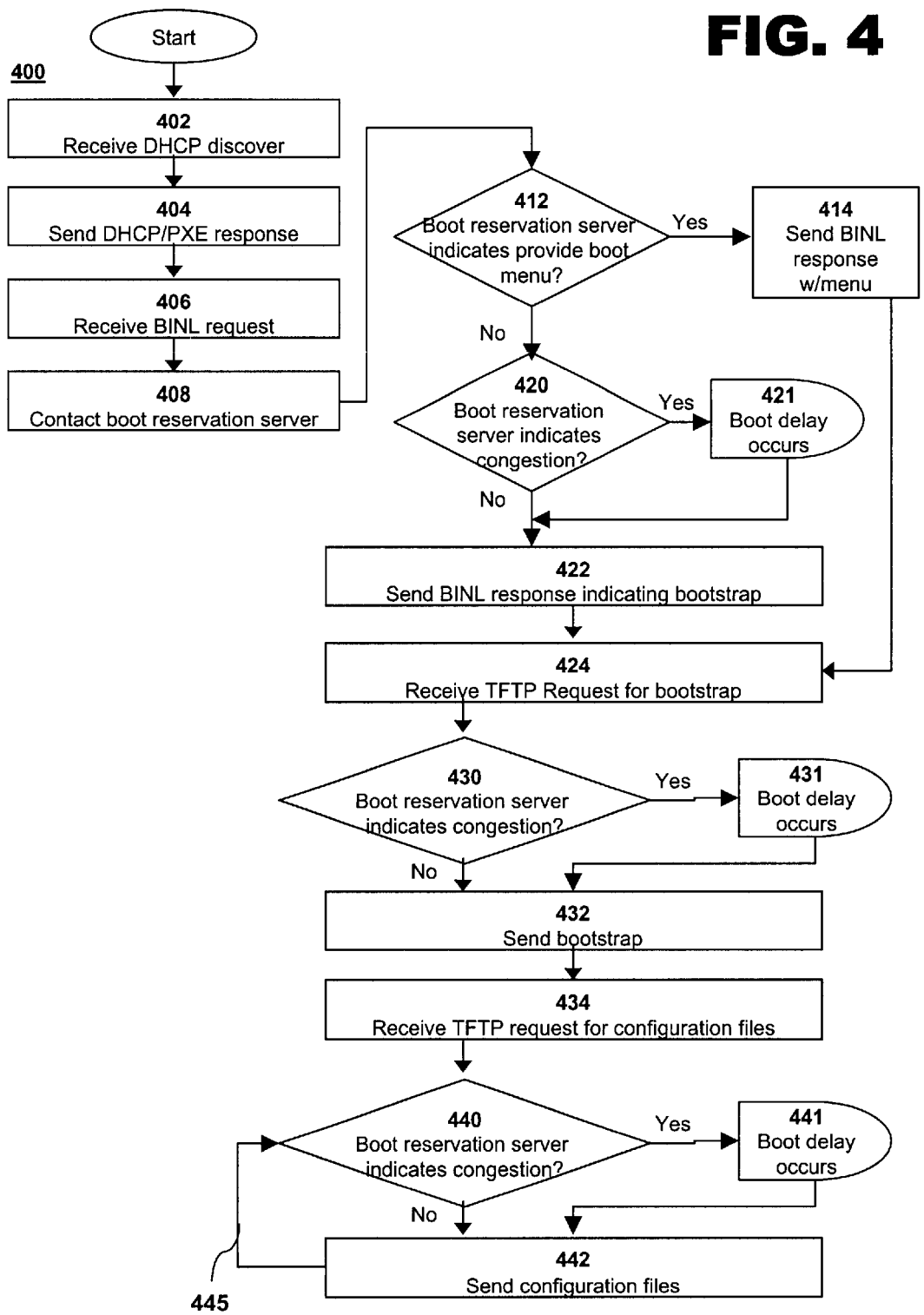
FIG. 4 is a flow diagram of one embodiment of a method of booting a target device in a network environment in accordance with the present invention.

FIG. 4 shows one embodiment of a method for booting a target device in accordance with the present invention at 400. The target device may be, for example, one or more devices 108, 110, 112 depicted in FIG. 1 and described above. In the embodiment of FIG. 4, the method is described from the perspective of the server attempting to boot the target device; equivalent steps from the perspective of a boot reservation server and the target device are also contemplated by the present invention. In one embodiment of the invention, the server attempting to boot the target device and the boot reservation server may be the same server.

At block 402, the server may receive a DHCP discover or other similar request from one or more target devices. For example, one or more target devices may be connected to a network and send a DHCP broadcast to the network and servers, such as BINL servers, in communication with the network. The DHCP broadcast or DHCP discover may be a request for DHCP/PXE proxy offers.

At block 404, the server may send one or more DHCP/PXE responses. For example, the response may be one or more DHCP/PXE proxy offers that indicate which other components in communication with the target device are able to process a BINL request.

At block 406, the server may receive a BINL request from at least one target device. For example, the server may be a PXE proxy server, which receives a BINL request from one or more target devices. In one embodiment of the invention, this PXE proxy server is one of the servers making proxy offers at block 404.

At block 408, the server contacts the boot reservation server to determine whether or not a network delay exists.

Boot reservation server 107 may be any server capable of evaluating network boot resources and/or parameters. For example, boot reservation server 107 may be able to examine configuration files of target devices attached to the network and determine the OS of each target device. Boot reservation server 107 may also be able to examine one or more inventory databases of hardware scan information. Boot reservation server may also be able to examine other components of the network, such as loading devices or servers and evaluate the number of target devices requiring a specific OS that may be remotely booted from one or more loading devices or server. Boot reservation server 107 may also be able to determine the total duration required for a boot to complete on one or more target devices. Thus, boot reservation server may be able to evaluate the time it would take to boot a particular target device with a particular OS within a given network environment and to compare this with other target devices to determine which target device to boot first. Boot reservation server 107 may also use other suitable capacity description files, for example, parameters or descriptions provided by the system administrator, to make such determinations. Boot reservation server 107 may be capable of dynamically determining or learning network boot resources and/or parameters. Boot reservation server 107 may be capable of evaluating these parameters on a target device, a loading device or any other component of the network.

Boot reservation server 107 may monitor one or more suitable parameters for determining network boot resources, including, but not limited to, network congestion, server CPU utilization, server disk utilization, and numbers and resources of target devices in the process of booting. Boot reservation server 107 may also be capable to comparing these parameters to predetermined thresholds or to configurable thresholds.

At block 412, boot reservation server 107 may indicate to the server that a boot menu should be provided to one or more target devices. This menu may be provided whether or not the boot reservation server determines that a network delay exists. The determination of whether or not to provide a boot menu may be based on parameters including, but not limited to, the type of target device, the operating system requested by the device and network defaults set by an administrator. As seen at block 414, in one embodiment of the invention, a boot menu is sent to the target device, for example with the BINL response. The boot menu may be, for example, a menu offering choices to the user of the target devices, such as, for example, a choice of a standard bootstrap or a reboot bootstrap. Once the user selects the bootstrap, the method may proceed to block 424 where a TFTP request for the user-selected bootstrap is received by the server. Alternatively, the method may return to block 420 to evaluate network congestion before proceeding to block 424.

Alternatively, a boot menu may not be sent to the target device. Whether or not a boot menu is received by the target device, as seen at block 420, the boot reservation server may evaluate the state of the network and determine if there is congestion. This congestion may take several forms including, but not limited to, total network congestion, congestion between one or more target devices and one or more servers, congestion between one or more target devices and the boot reservation server, and congestion between one or more servers and the boot reservation server.

The boot reservation server may determine network congestion by measuring the length of time that it takes for one or more target devices to receive a response from one or more servers. Alternatively, the boot reservation server may determine network congestion by measuring the length of time that it takes for one or more servers to receive a response from one or more target devices. In one embodiment of the invention, the target device may have a predetermined time after which a delay is indicated, i.e. if a response is not received after the predetermined time, a delay is indicated. The target device may also detect the delay in any other suitable manner.

Alternatively, the boot reservation server may determine the state of network congestion by evaluating boot parameters. These boot parameters may be located on the target device or on a loading device or server. These boot parameters may be any suitable network boot resources and/or parameters. For example, boot parameters may be included in one or more configuration files of target devices attached to the network. Boot parameters may indicate a preferred OS of a target device target device. Boot parameters may include information or files from one or more loading devices or servers. Boot parameters may include the number of target devices requiring a specific OS that may be remotely booted from a given loading device or server. Boot may also include the total duration required for a boot to complete on one or more target devices. These boot parameters may indicate the time it would take to boot a particular target device with a particular OS within a given network environment. Evaluation of boot parameters may also include comparing target devices to determine which target device to boot first. Boot parameters may also include other suitable capacity description files, for example, parameters or descriptions provided by the system administrator.

In one embodiment of the invention, one or more target devices and/or servers may incorporate a "congested" indicator into its boot parameters. The congested indicator may indicate a state of network congestion. Alternatively, the congestion of the target device may be determined. For example, if the boot reservation server detects that the target device does not have the reserved boot resources, the target device is flagged as congested. As one example, the boot reservation server may determine the length of time that each target device may take to boot and may evaluate the state of congestion based on the boot duration of each target device. The boot reservation server may also determine which operating system is being requested by each device and a maximum number of target devices to receive a given operating system. If too many devices are requesting the same operating system (e.g., more than the maximum number of devices is requesting the operating system), the boot reservation server may determine that the network is congested. The boot reservation server may also determine how long a given operating system will take to boot on each target device. If the operating system will take a long time to boot, the boot reservation server may determine that the network is congested. In addition, if a large number of target devices are requesting an operating system that takes a long time to boot on the target devices, the boot reservation server may determine that the network is congested.

In one embodiment of the invention, boot reservation server may use resource management algorithms known in the art, such as for example, kernel support reservation mechanisms and the like.

If the evaluation at 420 indicates congestion, the boot reservation server may then indicate a response to be transmitted to a given target device. In one embodiment of the invention, as seen at block 421, this response is a boot delay that delays the target device from booting. This boot delay response may be any suitable response that indicates to the target device that there will be some delay before the target device receives a bootstrap. This boot delay response may also be any suitable response that prevents the target device from timing out before a bootstrap is received. Some suitable boot delay responses are described in co-pending application AUS920010149US1 entitled "METHOD AND SYSTEM FOR DELAYED BOOTING OF A TARGET DEVICE IN A NETWORK ENVIRONMENT" herein incorporated by reference in its entirety.

In one embodiment of the invention, the boot reservation server may send a first stage bootstrap to the target device to cause the boot delay. This first stage bootstrap may request permission from the boot reservation server to boot.

In another embodiment of the invention, the boot reservation server may check the target device's configuration file before causing a delay. Thus, when the target device requests a file from the server, the boot reservation server checks for a permission value (e.g., "delay", "block until notified") in the target device's configuration file. The delay may be implemented while the target device waits for further instructions, for example in the form of a UDP packet, from the boot reservation server.

In another embodiment of the invention, the boot reservation server may respond to the target device with a "wait" or "delay" value to cause the delay. The boot reservation server may then end the delay by sending the target device a message code indicating that the target device may now request files.

In another embodiment of the invention, the boot delay may be affected by rebooting the target device after a time specified by the boot reservation server. This response may be evoked by an alteration of the boot block. This alteration may take the form of, for example, a timeout value configured onto the boot block. The timeout value may indicate any suitable period of time after which the target device may time out. The timeout value may be configured by the administrator of the network or by any suitable component of the network. The timeout value may be based on any suitable parameters, such as, for example, number of target devices queued to boot at the same time.

In another embodiment of the invention, the delay may be controlled by a user command such as a command entered by a user of the target device. For example, the user may receive instructions such as "Delay due to network congestion—Press ENTER to override timeout and boot immediately" and end the timeout delay by pressing the ENTER key on a keyboard.

The boot delay may be transmitted by the BINL server to the target device. Alternatively, the boot reservation server may transmit the boot delay to the target device. Alternatively, the boot reservation server may modify one or more of the boot parameters described above so that a boot delay occurs. For example, boot parameters may be modified so that the target device times out, so that the target device delays its requests to the server or so that the server delays its responses to the target device.

If the evaluation at 420 does not indicate congestion, the boot reservation server may then indicate an alternate response to be transmitted to a given target device. The alternate response may be transmitted by the BINL server to the target device. Alternatively, the boot reservation server may transmit the response to the target device. In one embodiment of the invention, as seen at block 422, this response may be a BINL response that indicates a bootstrap. This response may also be any suitable response that allows booting of the target device to proceed.

For example, the BINL response may indicate a bootstrap to the target device. The BINL response may also indicate, for example, one or more BINL servers able to provide a bootstrap to the target device. In one embodiment of the invention, the bootstrap may be, for example, a bootstrap that has been modified by the boot reservation server with configuration data including, but not limited to data indicating a timeout value, data indicating a server-specified delay, a permission code or a congestion flag As seen at block 424, the server may then receive a TFTP request from the target device. In one embodiment of the invention, the request is for an initial NPB file. The request may also be a request for a bootstrap, for example, a bootstrap associated with a particular OS. The request may also be a request for a bootstrap chosen from a boot menu such as, for example, the boot menu described at block 414.

In the embodiment of the invention seen in FIG. 4, at block 430, the boot reservation server may again determine the state of network congestion using the means of evaluation described above.

As seen at block 431, if congestion is indicated, a boot delay may occur. The boot delay may be based on congestion indicated at blocks 420 and/or 430. As indicated above, this boot delay may be any suitable response that prevents the target device from timing out before a bootstrap is received. For example, the target device may slow down its requests to the server at this time or the server may slow its responses to the target device. As described above, the target device may also wait for a "continue" code from the boot reservation server or for a user command before proceeding to boot. Alternatively, the boot reservation server may also evaluate or modify the target device's boot parameters or the server's boot parameters before allowing the boot process to proceed.

Whether or not a delay occurs, the method may then proceed to block 432 where a response is sent to the target device by the BINL server or the boot reservation server. For example, the server may provide a bootstrap to the target device as the response. Alternatively, an OS and its associated bootstrap may be downloaded to the target device. In one embodiment of the invention, the NBP file is a chained bootstrap. This chained bootstrap may be specified once as the default bootstrap. This chained bootstrap may be the first bootstrap loaded on the target device. This chained bootstrap "chains" itself, e.g., interposes itself in front of, the actual OS/bootstrap to be used on the target machine. In one embodiment of the invention, a reference to this chained bootstrap is the only entry in the BINL server. Alternatively, a reference to this chained bootstrap may be the default reply of the BINL server. Thus, the BINL configuration may not change regardless of the OS/bootstrap eventually used on a given target device. The BINL configuration also may not change when a new OS is added into the system.

At block 434, the server may receive a TFTP request from the target device. This may be, for example, a request for configuration files.

In the embodiment of the invention seen in FIG. 4, at block 440, the boot reservation server may again determine the state of network congestion using the means of evaluation described above.

As seen at block 441, if congestion is indicated, a boot delay may occur. The boot delay may be based on congestion indicated at blocks 420, 430 and/or 440. As indicated above, this boot delay may be any suitable response that prevents the target device from timing out before a bootstrap is received. For example, the target device may slow down its requests to the server at this time or the server may slow its responses to the target device. As described above, the target device may also wait for a "continue" code from the boot reservation server or for a user command before proceeding to boot. Alternatively, the boot reservation server may also evaluate or modify the target device's boot parameters or the server's boot parameters before allowing the boot process to proceed.

At block 442, the server may then send all or some of the configuration files. These files may be, for example, additional files necessary to boot a minimal OS (e.g., an operating system kernel). The files may also be the remainder of the core operating system. These files may include, for example, files to load target device drivers and system libraries of the target device. Alternatively, the target device may receive an installation program. These files may be loaded onto the target device. These files may then be executed on the target device.

In the embodiment shown in FIG. 4, the boot reservation server may evaluate congestion repeatedly, for example, before each configuration file is sent to the target device. This is indicated by the loop at 445. Alternatively, the boot reservation server may evaluate congestion only once before the server sends all configuration files to a given device.

While the present invention has been described in the context of a fully functioning data processing system, it will be appreciated that the processes described may be distributed in any other suitable context. For example, the processes described may take the form of a computer readable medium of instructions. The present invention applies equally regardless of the type of signal-bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms such as, for example, radio frequency and light wave transmissions. The computer readable media may take the form of coded formats that are decoded for actual use in a particular data processing system.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

What is claimed is:

1. A method of booting a plurality of target devices in communication with a network so that the target devices do not time out, comprising:

receiving, at a loading device, a request for a boot file from at least one target device;

contacting a boot reservation server in communication with the plurality of target devices;

evaluating, at the boot reservation server, boot resources of the network to determine a response to the at least one target device; and executing a boot delay at the at least one target device as the response.

2. The method of claim 1 further comprising:

executing a bootstrap at the target device, the bootstrap adapted to request permission from the boot reservation server to boot.

3. The method of claim 1 further comprising:

evaluating a permission value of the target device; and executing the boot delay based on the permission value.

4. The method of claim 1 further comprising:

transmitting a delay value to the target device wherein the delay value delays the target device from requesting files.

5. The method of claim 4 further comprising:

transmitting a permission value to the target device wherein the permission value allows the target device to request files.

6. The method of claim 1 further comprising:

configuring a boot block of the target device with a timeout value as the response; and rebooting the target device after the timeout value has expired.

7. The method of claim 1 further comprising:
receiving a user command; and
executing the boot delay based on the user command.

8. The method of claim 1 further comprising:
determining a device boot duration for each target device; and
executing the boot delay based on the device boot duration.

9. The method of claim 1 further comprising:
determining a target operating system for each target device;
determining a maximum number of target devices to receive the target operating system; and
transmitting the boot file to the target device if the maximum number has not been attained.

10. The method of claim 1 further comprising:
determining a boot duration of a target operating system for each target device; and
executing the boot delay based on the boot duration of the target operating system.

11. The method of claim 1, wherein the boot resources comprise a least one of the group consisting of server CPU utilization, server disk utilization, and numbers and resources of target devices in the process of booting.

12. Computer program product in a computer usable medium for booting a plurality of target devices in communication with a network so that the target devices do not time out, comprising:
means for receiving, at a loading device, a request for a boot file from at least one target device;
means for contacting a boot reservation server in communication with the plurality of target devices;
means for evaluating, at the boot reservation server, boot resources of the network to determine a response to the at least one target device; and
means for executing a boot delay at the at least one target device as the response.

13. The program of claim 12 further comprising:
means for executing a bootstrap at the target device, the bootstrap adapted to request permission from the boot reservation server to boot.

14. The program of claim 12 further comprising:
means for evaluating a permission value of the target device; and
means for executing the boot delay based on the permission value.

15. The program of claim 12 further comprising:
means for transmitting a delay value to the target device wherein the delay value delays the target device from requesting files.

16. The program of claim 15 further comprising:
means for transmitting a permission value to the target device wherein the permission value allows the target device to request files.

17. The program of claim 12 further comprising:
means for configuring a boot block of the target device with a timeout value as the response; and
means for rebooting the target device after the timeout value has expired.

18. The program of claim 12 further comprising:
means for receiving a user command; and
means for executing the boot delay based on the user command.

19. The program of claim 12 further comprising:
means for determining a device boot duration for each target device; and
means for executing the boot delay based on the device boot duration.

20. The program of claim 12 further comprising:
means for determining a target operating system for each target device;
means for determining a maximum number of target devices to receive the target operating system; and
means for transmitting the boot file to the target device if the maximum number has not been attained.

21. The program of claim 12 further comprising:
means for determining a boot duration of a target operating system for each target device; and
means for executing the boot delay based on the boot duration of the target operating system.

22. The computer program product of claim 12, wherein the boot resources comprise at least one of the group consisting of server CPU utilization, server disk utilization, and numbers and resources of target devices in the process of booting.

23. A system for booting a plurality of target devices in communication with a network so that the target devices do not time out, comprising:
means for receiving, at a loading device, a request for a boot file from at least one target device;
means for contacting a boot reservation server in communication with the plurality of target devices;
means for evaluating, at the boot reservation server, boot resources of the network to determine a response to the at least one target device; and
means for executing a boot delay at the at least one target device as the response.

24. The system of claim 23, further comprising:
means for executing a bootstrap at the target device, the bootstrap adapted to request permission from the boot reservation server to boot.

25. The system of claim 23, further comprising:
means for evaluating a permission value of the target device; and
means for executing the boot delay based on the permission value.

26. The system of claim 23, further comprising:
means for transmitting a delay value to the target device wherein the delay value delays the target device from requesting files.

27. The system of claim 26, further comprising:
means for transmitting a permission value to the target device wherein the permission value allows the target device to request files.

28. The system of claim 23, further comprising:
means for configuring a boot block of the target device with a timeout value as the response; and
means for rebooting the target device after the timeout value has expired.

29. The system of claim 23, further comprising:
means for receiving a user command; and
means for executing the boot delay based on the user command.

30. The system of claim 23, further comprising:
means for determining a device boot duration for each target device; and means for executing the boot delay based on the device boot duration.

31. The system of claim 23, further comprising:

means for determining a target operating system for each target device;

means for determining a maximum number of target devices to receive the target operating system; and means for transmitting the boot file to the target device if the maximum number has not been attained.

32. The system of claim 23, further comprising:

means for determining a boot duration of a target operating system for each target device; and means for executing the boot delay based on the boot duration of the target operating system.

33. The system of claim 23, wherein the boost resources comprise at least one of the group consisting of server CPU utilization, server disk utilization, and numbers and resources of target devices in the process of booting.

34. A system for booting a target device in communication with a network, comprising:

a plurality of target devices;

at least one loading device in communication with the target device; and at least one boot reservation server in communication with the loading device for evaluating boot resources of the network and sending a response to prevent the target device from timing out, the response based on the boot resources.

35. The system of claim 34, wherein the boot resources comprise at least one of the group consisting of server CPU utilization, server disk utilization, and numbers and resources of target devices in the process of booting.

36. A resource reservation server for booting a plurality of target devices in communication with a network so that the target devices do not time out, comprising:

means for determining a target operating system for each target device;

means for determining a maximum number of target devices to receive the target operating system;

means for determining a boot duration for each target operating system; and means for determining a response to each target device based on the target operating system, the maximum number and the boot duration.

37. The server of claim 36, wherein the boot resources comprise at least one of the group consisting of server CPU utilization, server disk utilization, and numbers and resources of target devices in the process of booting.

* * * * *